(12) United States Patent
Kamieniecki (10) Patent No.: US 12,128,853 B2
(45) Date of Patent: Oct. 29, 2024

(54) INTEGRATION OF CAR SECURITY AND HOME SECURITY SYSTEM

(71) Applicant: The ADT Security Corporation, Boca Raton, FL (US)

(72) Inventor: John Kamieniecki, Lafayette Hill, PA (US)

(73) Assignee: The ADT Security Corporation, Boca Raton, FL (US)

(*) Notice: Subject to any disclaimer, the term of this patent is extended or adjusted under 35 U.S.C. 154(b) by 193 days.

(21) Appl. No.: 18/067,537

(22) Filed: Dec. 16, 2022

(65) Prior Publication Data
US 2024/0198957 A1    Jun. 20, 2024

(51) Int. Cl.
*B60R 25/24* (2013.01)
*B60R 25/04* (2013.01)
*B60R 25/31* (2013.01)

(52) U.S. Cl.
CPC .............. *B60R 25/24* (2013.01); *B60R 25/04* (2013.01); *B60R 25/31* (2013.01); *B60R 2025/0405* (2013.01)

(58) Field of Classification Search
CPC ......... B60R 25/24; B60R 25/04; B60R 25/31; B60R 2025/0405; B60R 25/102
USPC .......................................................... 701/36
See application file for complete search history.

(56) References Cited

U.S. PATENT DOCUMENTS

| | | | |
|---|---|---|---|
| 5,543,778 A * | 8/1996 | Stouffer ................. | G08B 25/10 340/425.5 |
| 8,988,205 B2 | 3/2015 | Poder | |
| 9,542,821 B2 * | 1/2017 | Watanabe .............. | G08B 7/064 |
| 9,718,441 B2 * | 8/2017 | Cogill ..................... | B60R 25/30 |
| 11,999,230 B2 * | 6/2024 | Alberga ................. | B60K 28/00 |
| 2003/0206102 A1 * | 11/2003 | Joao .................... | B64D 45/0031 340/425.5 |
| 2005/0128068 A1 * | 6/2005 | Winick ................ | G08B 25/008 340/517 |
| 2005/0283302 A1 * | 12/2005 | Zakrewski .......... | B60R 25/1003 701/112 |
| 2006/0049921 A1 * | 3/2006 | Hara ....................... | B60R 25/00 340/426.1 |
| 2006/0198333 A1 * | 9/2006 | Sabo ..................... | H04W 24/00 370/465 |
| 2007/0040650 A1 * | 2/2007 | Handley ............ | G07C 9/00182 340/5.72 |
| 2007/0182543 A1 * | 8/2007 | Luo ...................... | G08B 15/002 340/541 |

(Continued)

*Primary Examiner* — Tyler D Paige
(74) *Attorney, Agent, or Firm* — Weisberg I.P. Law. P.A.

(57) ABSTRACT

A method implemented by a security control device of a premises security system that is configured to monitor a premises includes communicating, via the premises security system, with a component of a vehicle and controlling an ability of the vehicle to be driven. The ability of the vehicle to be driven may be based on a state of the premises security system. Sensor information received from a premises device of the security system that indicates the presence of an occupant within the premises may be used to control the ability of the vehicle to be driven. In addition, the premises security system may communicate with the vehicle's key fob and control the ability of the vehicle to be driven using the key fob and its detected location. The ability of the vehicle to be driven can also be managed in accordance with a predefined time schedule.

21 Claims, 3 Drawing Sheets

(56) References Cited

U.S. PATENT DOCUMENTS

| | | | |
|---|---|---|---|
| 2009/0322535 A1* | 12/2009 | Shin | B60R 25/102 |
| | | | 340/572.1 |
| 2010/0164719 A1* | 7/2010 | George | G08B 25/009 |
| | | | 340/541 |
| 2014/0139331 A1* | 5/2014 | Oliver | B60R 25/04 |
| | | | 340/426.19 |
| 2015/0298654 A1* | 10/2015 | Joao | G01S 19/13 |
| | | | 701/2 |
| 2018/0068544 A1* | 3/2018 | Caperell | H04W 4/027 |
| 2020/0219383 A1* | 7/2020 | Tieman | G08C 17/02 |
| 2024/0198957 A1* | 6/2024 | Kamieniecki | B60R 25/24 |

\* cited by examiner

INTEGRATION OF CAR SECURITY AND HOME SECURITY SYSTEM

TECHNICAL FIELD

The present technology is generally related to the integration of vehicle security into premises security systems.

BACKGROUND

Securing vehicles, such as cars, from theft is a common problem. Many cars have had their windows smashed, been jump started, and stolen. A fob, commonly called a key fob, is a small security hardware device with built-in authentication used to wirelessly control and secure access to vehicles, devices, computer systems, network services and data. As key fob and car alarm security technology has improved, it has gotten harder for thieves to open doors, jump start the car and/or bypass the security alarm of a car without the car's key fob. As a result, there have been an increasing number of recorded car thefts where thieves have either broken into houses, or simply entered through unlocked doors or windows, grabbed a car's key fob, and made off with the car. Thus, some thieves are apparently moving to the much simpler method of simply stealing the key fob associated with the car, provided they can locate the key fob. Some of these incidents have been during daylight hours, and have occurred quickly and quietly, without immediate notice.

In many homes, car key fobs are often kept in prominent, easy to view or access locations, such as hanging from wall mounted key hooks, or front coffee and end tables near the house door or entry way. Even if the home has an alarm and the alarm sounds, the thieves can still quickly make off the with key fob(s) and car(s) before help is likely to arrive. The fundamental assumption with car security is that the possessor of the key fob is the rightful accessor of the car. However, this assumption is sometimes wrong.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Before describing in detail exemplary embodiments, it is noted that embodiments may reside in combinations of apparatus components and processing steps related to the integration of vehicle security into premises security systems. Accordingly, components have been represented where appropriate by conventional symbols in the drawings, focusing on only those specific details that facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
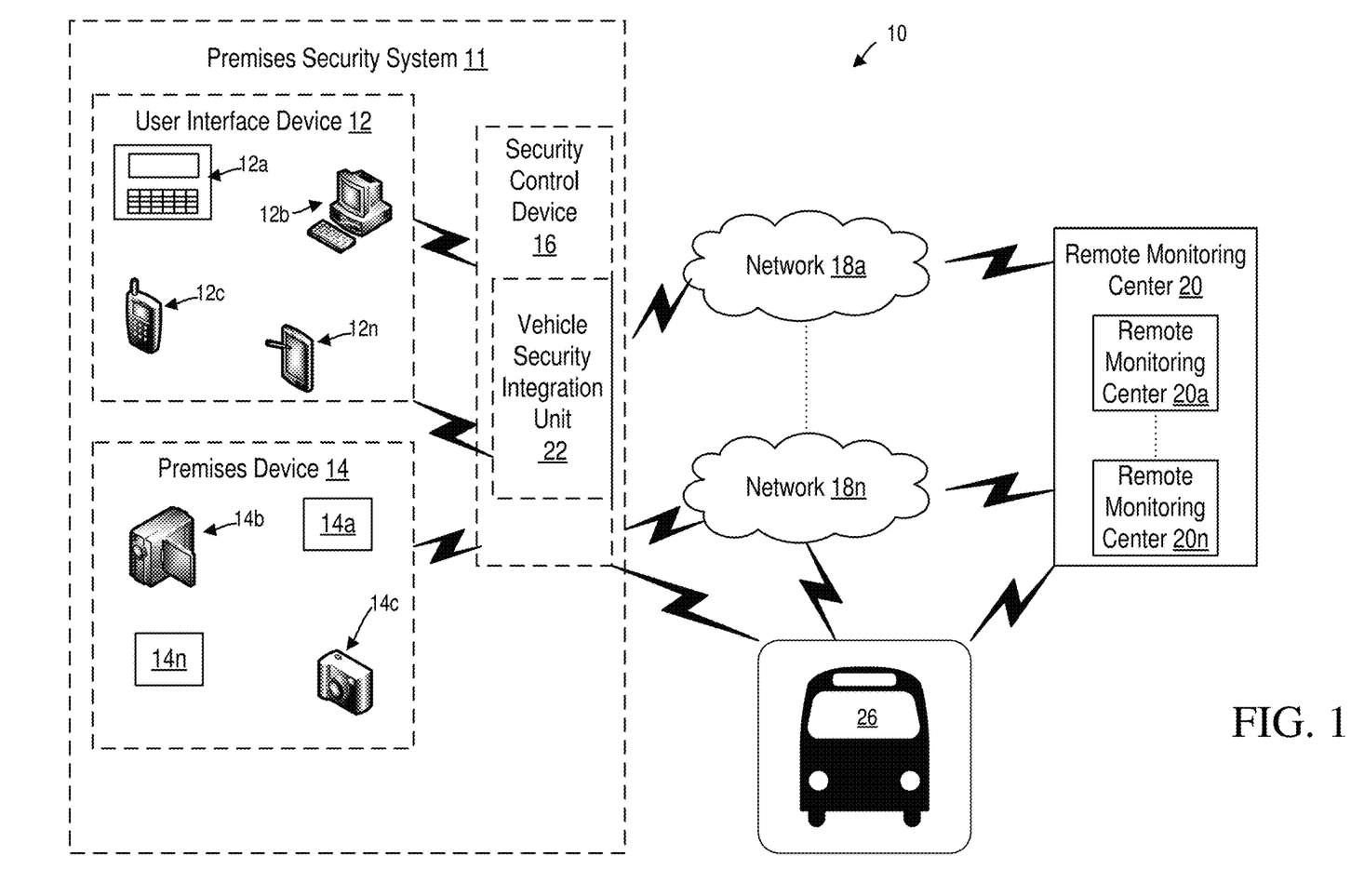
FIG. 1 is a block diagram that illustrates a premises security system in accordance with various embodiments of the present disclosure.

Referring now to the drawing figures in which like reference designators refer to like elements there is shown in FIG. 1 a system designated generally as "10." System 10 may include premises security system 11 where premises security system 11 includes and/or is associated with one or more user interface devices 12a to 12n (collectively referred to as "user interface device 12"), one or more premises devices 14a to 14n (collectively referred to as "premises device 14"), and security control device 16. System 10 may further include one or more networks 18a to 18n (collectively referred to as "network 18"), and one or more remote monitoring centers 20a to 20n (collectively referred to as "remote monitoring center 20"), communicating with each other or with at least one other entity in system 10.

User interface device 12 may be a device, such as a wired or wireless device, which allows a user to communicate with security control device 16. User interface device 12 may be a portable control keypad and/or interface 12a, computer 12b, mobile phone 12c and tablet 12n, among other devices that allow a user to interface with premises device 16 and/or one or more premises devices 14. User interface device 12 may communicate at least with security control device 16 using one or more wired and/or wireless communication protocols. For example, portable control keypad 12a may communicate with security control device 16 via a ZigBee based communication link, e.g., network based on Institute of Electrical and Electronics Engineers (IEEE) 802.15.4 protocols, and/or Z-wave based communication link, or over the premises' local area network, e.g., network-based on IEEE 802.11 protocols, user interface device 12.

Premises devices 14 may include one or more types of sensors, that may also include or be control and/or image capture devices. For example, a single premises device 14 sensor may include multiple image capture devices (e.g., several digital camera devices pointed at different angles, generating multiple respective video/image/audio streams, contained within a single premises device 14). For example, the types of sensors may include various safety related sensors such as motion sensors, fire sensors, carbon monoxide sensors, flooding sensors and contact sensors, among other sensor types. The premise devices 14 may include, for example, one or more lifestyle (e.g., home automation) related devices configured to adjust at least one premises setting such as lighting, temperature, energy usage, door lock and power settings, among other settings associated with the premises or devices on the premises. Image capture devices may include a digital camera and/or video camera, among other image captures devices that are well known in the art. Premises device 14 may communicate with security control device 16 via proprietary wireless communication protocols and may also use Wi-Fi, both of which are known in the art. Other communication technologies can also be used, and the use of Wi-Fi is merely, for example. Those of ordinary skill in the art will also appreciate that various additional sensors and control and/or image capture devices may relate to life safety or lifestyle depending on both what the sensors, control and image capture devices do and how these sensors, control and image devices are used by system 10.

Security control device 16 may provide one or more of management functions, image and/or video stitching functions, image and/or video analysis functions, control functions such as power management, premises device management and alarm management and/or analysis, among other functions to premises security system 11. In particular, security control device 16 may manage one or more life safety and lifestyle features. Life safety features may correspond to security system functions and settings associated with premises conditions that may result in life threatening harm to a person, such as carbon monoxide detection and intrusion detection. Lifestyle features may correspond to security system functions and settings associated with video capturing devices and non-life-threatening conditions of the premises, such as lighting and thermostat functions. In one or more embodiments, security control device 16 may include one or more displays, as described herein. Security control device 16 may also include a vehicle security integration unit 22. The vehicle security integration unit 22 may be configured to communicate with a component of a vehicle 26 and control the ability of the vehicle to be driven based on the communication with the component of the vehicle 26. As used herein, controlling the ability of the vehicle to be driven includes, but is not limited to controlling the ability of the vehicle to be started in the case of a fossil-fuel powered vehicle, and controlling the ability of the vehicle's battery and/or electric motor(s) to provide locomotive power or locomotion in the case of an electric vehicle. Controlling can include deactivating the ability of the vehicle to be driven as well as activating the ability of the vehicle to be driven. The vehicle security integration unit 22 output may also be transmitted to the remote monitoring center 20, vehicle 26 and/or other entities in system 10 for further analysis. In one or more embodiments, vehicle 26 may include a vehicle security integration unit 22.

Security control device 16 may communicate with network 18 via one or more communication links. In particular, the communications links may be broadband communication links such as a wired cable modem or Ethernet communication link, and digital cellular communication link, e.g., long term evolution (LTE) and/or 5G based link, among other broadband communication links known in the art. Broadband as used herein may refer to a communication link other than a plain old telephone service (POTS) line. Ethernet communication link may be an IEEE 802.3 or 802.11 based communication link. Network 18 may be a wide area network, local area network, wireless local network, metropolitan area network, or other type of network. Network 18 provides communications between security control device 16 and remote monitoring center 20. Network 18 may also provide communications between security control device 16 and vehicle 26. In one or more embodiments, security control device 16 may be part of premises device 14 or user interface device 12. In one or more embodiments, security control device 16 is part of remote monitoring center 20 or may be logical devices implemented in a remote computing environment.

While security control device 16 is illustrated as being a separate device from user interface device 12 and premises device 14, in one or more embodiments, security control device 16 may be integrated with one or more user interface devices 12 and/or premises devices 14 and/or other entity or device located at premises associated with premises security system 11.

Non-limiting example implementations, in accordance with one or more embodiments, of security control device 16 discussed in the preceding paragraphs will now be described with reference to FIG. 2. The system 10 includes a security control device 16 that includes hardware 28 enabling the security control device 16 to communicate with one or more entities in system 10, and/or a component of vehicle 26, and to perform one or more functions described herein. The hardware 28 may include a communication interface 30 for setting up and maintaining at least a wired and/or wireless connection to a component of vehicle 26 and/or one or more entities in system 10 such as remote monitoring center 20, premises device 14, user interface device 12, etc. The security control device 16 hardware 28 includes user interface 24 which allows a user to enter inputs to, and receive outputs, from security control device 16.

In the embodiment shown, the hardware 28 of the security control device 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors, processor cores, field programmable gate arrays (FPGAs), and/or application specific integrated circuits (ASICs) adapted to execute software and/or firmware, e.g., embedded firmware instructions. The processor 36 may be configured to access (e.g., write to and/or read from) the memory 38, which may comprise any kind of volatile and/or nonvolatile memory, e.g., cache and/or buffer memory, random access memory (RAM), read-only memory (ROM), optical memory, and/or erasable programmable read-only memory (EPROM).

Thus, the security control device 16 further has software 40 stored internally in, for example, memory 38, or stored in external memory (e.g., database, storage array, network storage device, etc.) accessible by the security control device 16 via an external connection. The software 40 may be executable by the processing circuitry 34. The processing circuitry 34 may be configured to control any of the methods and/or processes described herein and/or to cause such methods, and/or processes to be performed, e.g., by security control device 16. Processor 36 corresponds to one or more processors 36 for performing security control device 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to security control device 16. For example, processing circuitry 34 of the security control device 16 may include vehicle security integration unit 22 which is configured to perform one or more security control device 16 functions described herein such as with respect to the integration of vehicle security into premises security systems. In another example, processing circuitry 34 of the security control device 16 may include vehicle security integration unit 22 which is configured to communicate with a component of a vehicle 26 and control the ability of the vehicle to be driven based on the communication with the component of the vehicle 26.

Figure 2:
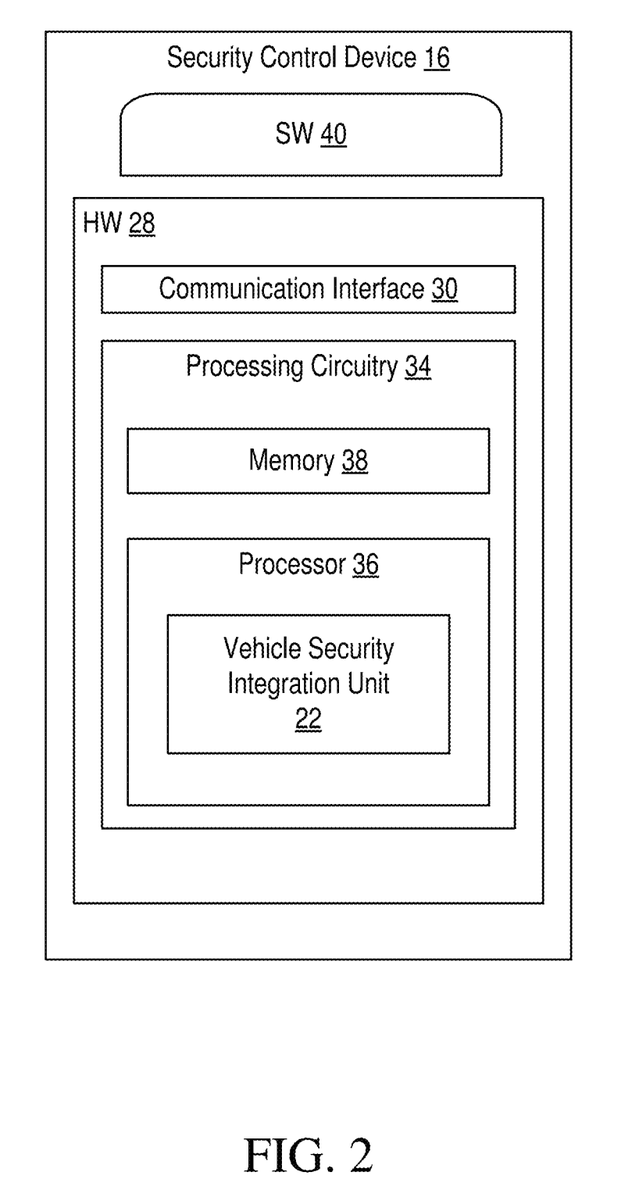
FIG. 2 is an illustration of exemplary hardware and software for a security control device for a premises security system in accordance with various embodiments of the present disclosure.

Although FIGS. 1 and 2 show vehicle security integration unit 22 as being within a respective processor, it is contemplated that this unit may be implemented such that a portion of the unit is stored in a corresponding memory within the processing circuitry. In other words, the unit may be implemented in hardware or in a combination of hardware and software within the processing circuitry. Further, while security control device 16 is described as including a vehicle security integration unit 22 for communicating, for example, with a component of a vehicle 26 and controlling the ability of the vehicle to be driven based on the communication with the component of the vehicle 26, one or more of these functions may alternatively be performed by a remote server in network 18, remote monitoring center 20, cloud network and/or by another device in communication with premises security system 11 via network 18.

In one embodiment, security system 11 includes a plurality of premises devices 14, i.e., sensors, and a security control device 16 in communication with the plurality of sensors, the security control device 16 has at least one processor 36 and memory 38 storing a plurality of computer instructions that, when executed by the at least one processor 36, cause the at least one processor to:
obtain a first security system command for the security control device 16 to enter an armed state;
transmit to a receiver installed in a vehicle 26 associated with the security system 11 a first vehicle command to deactivate an ability of the vehicle 26 to be driven;
obtain a second security system command for the security control device 16 to enter a disarmed state; and in response to the second security system command, transmit to the receiver installed in the vehicle a second vehicle command to activate the ability of the vehicle 26 to be driven.

Figure 3:
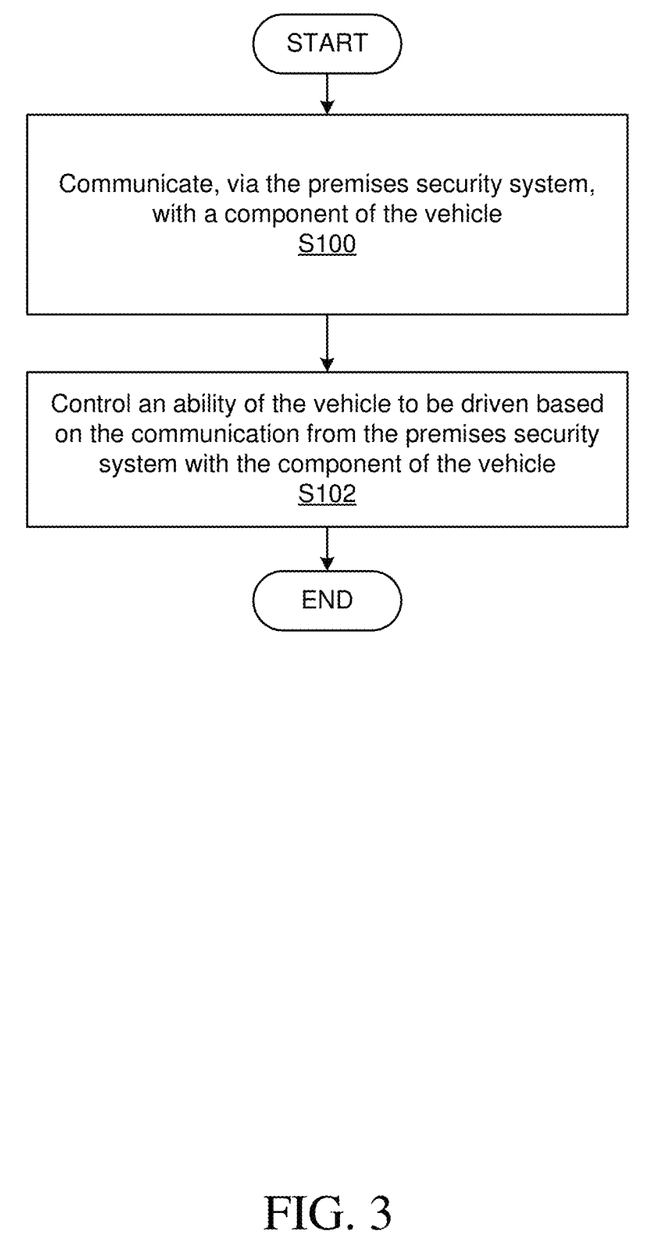
FIG. 3 is a flow chart that illustrates a method for operating a security control device for a premises security system in accordance with various embodiments of the present disclosure.

FIG. 3 is a flow chart that illustrates an example of a method for operating a security control device 16 for a premises security system 11 in accordance with various embodiments of the present disclosure. One or more blocks described herein may be performed by one or more elements of security control device 16, such as by processing circuitry 34 (including vehicle security integration unit 22), processor 36, etc. Accordingly, security control device 16 is configured to communicate (Block S100) with a component of the vehicle 26. Premises device 16 is also configured to control (Block S102) the ability of the vehicle to be driven based on the communication with the component of the vehicle 26.

According to one or more embodiments, the processing circuitry 34 and/or vehicle security integration unit 22 is further configured to control the ability of the vehicle to be driven based on a state of the premises security system 11. Further, in one or more embodiments, the state is one of an arm or disarm state of the premises security system 11.

According to one or more embodiments, the security control device 16, processing circuitry 34 and/or vehicle security integration unit 22 are further configured to receive sensor information from at least one premises device 12 or 14 of the premises security system 11. The sensor information indicates the presence of an occupant within the premises and the ability of the vehicle to be driven is controlled based upon the detected presence of the occupant.

According to one or more embodiments, the component of the vehicle 26 is a key fob and the processing circuitry is further configured to communicate with the key fob and control the ability of the vehicle to be driven using the key fob. Further, in one or more embodiments, the security control device 16, processing circuitry 34 and/or vehicle security integration unit 22 are further configured to detect a location of the key fob and control an ability of the key fob to allow the vehicle 26 to be driven based on a detected location of the key fob.

In some embodiments, the processing circuitry 34 is further configured to control the ability of the vehicle to be driven by at least one of controlling a remote key fob radio receiver in the vehicle 26 and controlling a key fob transmitter.

According to one or more embodiments, the security control device 16, processing circuitry 34 and/or vehicle security integration unit 22 are further configured to control the ability of the vehicle to be driven in accordance with a predefined time schedule managed by the security control device 16. In some embodiments, the processing circuitry 34 is further configured to control the ability of the vehicle to be driven based on a user input at a premises security control panel. The processing circuitry 34 may be configured to control the ability of the vehicle to be started by controlling the vehicle's starter system.

Various embodiments of the disclosure integrate a vehicle 26 security and/or starter and/or locomotive battery system with a premises security system 11 to provide additional security checks and a means to independently disable the vehicle 26 from being driven. There are variety of ways to integrate vehicle security with a premises security system 11 in accordance with the various embodiments, including but not limited to, directly in the vehicle 26, directly in the vehicle's key fob, or a combination of these integration points. In some embodiments, the vehicle 26, such as a car, automobile, truck, lawn tractor, etc., ability to be driven state becomes another state controlled by the premises security system 11, through the usual 'arm/disarm' routines via user interaction with the premises security system 11. This may include using automated time bound/schedules to secure the vehicle 26 based on the time of day, day, week, etc.

One method used in the past was for some car owners to equip their vehicles 26 with a manually activated kill switch placed in some hidden location inside the car. Accordingly, in some embodiments an electronic kill switch can be employed in a vehicle 26 that is remotely activated and deactivated, i.e., controlled, by the vehicle security control device 16 and/or remote monitoring center 20.

While users might also consider hiding their car keys or key fobs, or putting them in some secured area inside the home, this requires diligence to both remember to store the keys away and remember their hiding place, and thus adds inconvenience. Various embodiments avoid these problems by integrating the vehicle 26 security system into the premises security system 11. Arming the premises security system 11 with a state such as "Stay", when home occupants are in for the evening, for example, can also deactivate the ability of vehicle 26 to be driven. Conversely, the vehicle 26 can be enabled for driving when the user puts the alarm into an 'Away' state and/or in accordance with other alarm states dedicated to the household's vehicles 26 themselves.

In some embodiments, specific vehicle arm or disarm states can also be programmed, so, for example, the premises can remain open or unlocked, but the ability of vehicle 26 to be driven is still disabled if no one is planning to drive anywhere. This prevents daytime 'walk in, grab the key fob, drive away' theft scenarios while the premises may be in an open/unarmed state. If the premise's alarm is armed and sounds when a thief enters the home, this functionality can be utilized to further impede a quick get away with the vehicle 26 if the key fobs are in a visible and/or easy access location.

Time schedules for allowing control of the vehicle 26 may programmed as well, for example, a car that is parked in the driveway defaults to a disabled ability to be driven every weeknight from 8 pm through 7 am. The ability of vehicle 26 to be driven can be reactivated by an alarm state, such as disarm or other user interaction with the premises security system 11, which may or may not be independent from the vehicle's key fob.

Depending on the integration point, embodiments may entail disabling the vehicle's starter system and/or locomotive powering system (e.g., for battery powered vehicles) and/or disabling the remote key fob radio receiver in the vehicle, and/or disabling the vehicle key fob transmitters, and/or adding a geofencing type detection of the key fob's location, for example, to know when the key fob has been taken outside the house. Bluetooth is used frequently in this disclosure as an example radio since it is commonly installed in many devices and applications, however any suitable radio technology, e.g., ultra-wideband (UWB) protocols and/or technology, may be used in a particular embodiment, for example for locating the physical location of a key fob.

In some embodiments, a radio transceiver may be integrated into vehicle 26 to allow direct communication with the premises security system 11. The vehicle 26 then becomes another device 14 of the premises security system 11. As a result, the key fob for vehicle 26 cannot be used to circumvent the premises security system's 11 control of the vehicle's 26 ability to be driven since the premises security system 11 must first be disarmed before the vehicle 26 is allowed to be driven. In some embodiments, the radio transceiver may be embodied in an aftermarket module that is installed in the vehicle and communicates with the control system of the vehicle 26 via the controller area network (CAN) bus of the vehicle, for example. In other embodiments, the radio transceiver may be embodied in a radio and/or multimedia system of the vehicle 26 that can communicate with the control system of the vehicle 26. In alternative embodiments, the radio transceiver may be integrated directly into the vehicle's control system during design and manufacturing.

In some embodiments, arm/disarm events from the premises security system 11 may trigger appropriate behaviors at the vehicle 26 such as disabling the starter and/or locomotive batteries and/or motors (e.g., in the case of battery operated vehicles), or powering down the vehicle's key fob receiver, making it impossible to unlock/start/drive the vehicle 26. Distances between premises security system 11 and vehicle 26 are usually reasonably short, with vehicles typically parked in the home driveway, garage, or out front on the street. Exterior repeaters may be included at the premises if necessary to reach the vehicle 26.

In various embodiments, the vehicle radio transceiver may wake and sleep at certain intervals to stay in contact with the premises security system 11, and may be integrated into the vehicle's security system to provide enable/disable signaling that is independent of the key fob. In such embodiments, the vehicle 26 can be configured such that it cannot be driven until both the alarm system has enabled the vehicle, and the key fob is used.

In various embodiments, a radio transceiver could be integrated directly into the key fob for vehicle 26 to allow direct communication with the premises security system 11. The key fob then becomes another device 14 of the premises security system 11, and can disable its own vehicle's security transmitter based on alarm and/or arm or disarm events at the premises security system 11. In some embodiments, this functionality may be integrated into the key fob software and hardware. Alternatively, this functionality may be retrofitted into the key fob itself. If the key fob is manufactured with a BLUETOOTH radio for example, the BLUETOOTH radio can be paired to the premises security system 11. Key fob instructions, such as enable/disable events, can then be communicated directly to the key fob for vehicle 26 from the premises security system 11. The BLUETOOTH radio can additionally be used to geofence the key fob inside the user's home as described herein. In various embodiments, a hidden and/or obscured passive radio tag may be installed on, or inside, the vehicle's key fob. Further, a small radio, Bluetooth as an example, hidden in a keychain charm or ornament that the key fob is attached to, may also be included.

Embodiments may be used with active premises security system 11 radios in the premises to locate the key fob's relative position, triggering an alarm if the key fob passes through, for example, a home entrance or window, or when it ranges out of communication distance with the premises. Even if the geofencing is not utilized to disable the ability of vehicle to be driven, the geofencing provides advanced notice to the premises security system 11 of unauthorized movement of the vehicle 26 which could trigger a faster response from authorities. Embodiments may also be used to create a curfew for car use by younger house members, automatically disabling the vehicles during certain windows, i.e., after midnight and until 8 am.

In one embodiment, the premises security system 11 is configured such that, when a break-in event and/or other premises-based alarm event occurs and/or is detected, security control device 16 and/or remote monitoring center 20 prevents the vehicle 26 from being driven in response to the event. Examples of preventing the vehicle 26 from being driven are discussed above.

As described above, embodiments provided herein advantageously allow the integration of a premises security system with vehicle security in a manner that allows the premises security system to control access to the vehicle.

As will be appreciated by one of skill in the art, the concepts described herein may be embodied as methods, systems, computer program products and/or computer storage media storing executable computer programs. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the disclosure, which is limited only by the following claims.

What is claimed is:

1. A security system for a premises, comprising:
   a plurality of sensors; and
   a security control device in communication with the plurality of sensors, the security control device comprising at least one processor and memory storing a plurality of computer instructions that, when executed by the at least one processor, cause the at least one processor to:
   obtain a first security system command for the security control device to enter an armed state;
   in response to the first security system command, transmit to a receiver installed in a vehicle associated with the security system a first vehicle command to deactivate an ability of the vehicle to be driven;
   obtain a second security system command for the security control device to enter a disarmed state; and
   in response to the second security system command, transmit to the receiver installed in the vehicle a second vehicle command to activate the ability of the vehicle to be driven.

2. A method implemented by a security control device of a premises security system that is configured to monitor a premises, the method comprising:

communicating, via the premises security system, with a component of a vehicle; and controlling an ability of the vehicle to be driven based on the communication from the premises security system with the component of the vehicle.

3. The method of claim 2, further comprising controlling the ability of the vehicle to be driven based on a state of the premises security system.

4. The method of claim 3, wherein the state is one of an arm or disarm state of the premises security system.

5. The method of claim 2, further comprising:

receiving sensor information from at least one premises device of the premises security system, the sensor information indicating a presence of an occupant within the premises; and controlling the ability of the vehicle to be driven based upon the detected presence of the occupant.

6. The method of claim 2, wherein the component is a key fob, the method further comprising communicating with the key fob and controlling the ability of the vehicle to be driven using the key fob.

7. The method of claim 6, further comprising detecting a location of the key fob and controlling an ability of the key fob to allow the vehicle to be driven based on the key fob's detected location.

8. The method of claim 6, further comprising controlling the ability of the vehicle to be driven by at least one of controlling a remote key fob radio receiver in the vehicle, and controlling a key fob transmitter.

9. The method of claim 2, further comprising controlling the ability of the vehicle to be driven in accordance with a predefined time schedule managed by the security control device.

10. The method of claim 2, further comprising controlling the ability of the vehicle to be driven based on a user input at a premises security control panel.

11. The method of claim 2, further comprising controlling the ability of the vehicle to be started by controlling the vehicle's starter system.

12. A security control device associated with a premises security system that is configured to monitor a premises, the security control device comprising:

processing circuitry configured to:

communicate with a component of the vehicle; and control the ability of the vehicle to be driven based on the communication with the component of the vehicle.

13. The security control device of claim 12, wherein the processing circuitry is further configured to control the ability of the vehicle to be driven based on a state of the premises security system.

14. The security control device of claim 13, wherein the state is one of an arm or disarm state of the premises security system.

15. The security control device of claim 12, wherein the processing circuitry is further configured to:

receive sensor information from at least one premises device of the premises security system, the sensor information indicating a presence of an occupant within the premises; and control the ability of the vehicle to be driven based upon the detected presence of the occupant.

16. The security control device of claim 12, wherein the component is a key fob, and the processing circuitry is further configured to communicate with the key fob and control the ability of the vehicle to be driven using the key fob.

17. The security control device of claim 16, wherein the processing circuitry is further configured to detect a location of the key fob and control an ability of the key fob to allow the vehicle to be driven based on a detected location of the key fob.

18. The security control device of claim 16, wherein the processing circuitry is further configured to control the ability of the vehicle to be driven by at least one of controlling a remote key fob radio receiver in the vehicle and controlling a key fob transmitter.

19. The security control device of claim 12, wherein the processing circuitry is further configured to control the ability of the vehicle to be driven in accordance with a predefined time schedule managed by the security control device.

20. The security control device of claim 12, wherein the processing circuitry is further configured to control the ability of the vehicle to be driven based on a user input at a premises security control panel.

21. The security control device of claim 12, wherein the processing circuitry is further configured to control the ability of the vehicle to be started by controlling the vehicle's starter system.

* * * * *